Oct. 30, 1945. J. M. TYRNER 2,387,864
STARTING DEVICE FOR GRAVITY ARC WELDERS
Filed Dec. 4, 1944

INVENTOR
Joseph M. Tyrner
BY
Pennie, Davis, Marvin & Edmonds
ATTORNEYS

Patented Oct. 30, 1945

2,387,864

UNITED STATES PATENT OFFICE 2,387,864

STARTING DEVICE FOR GRAVITY ARC WELDERS

Joseph M. Tyrner, New York, N. Y., assignor to Air Reduction Company, Incorporated, a corporation of New York Application December 4, 1944, Serial No. 566,416

5 Claims. (Cl. 219—8)

This invention relates to gravity-feed arc-welding apparatus and more particularly to a device for drawing the arc and starting the welding operation once the apparatus has been aligned with the work.

In my co-pending application Serial No. 543,883, filed July 7, 1944, I have described a gravity-feed arc-welding apparatus in which the starting operation is effected with an electrode which has a specially-formed tip. Such electrode is hollowed or tapered to lessen the cross-sectional area of the welding material at the tip so that, as the starting current is turned on, the tip portion will readily melt and an arc thereby drawn.

It is the object of the present invention to provide a gravity-feed arc-welding apparatus in which standard or uniform electrodes can be utilized.

According to the present invention, there is provided, on the upper end of the incline or slide part, a device adapted to slowly draw the electrode away from the metal workpiece to obtain the starting arc. This device is manually operated and, once the arc has been struck, it is readily operable to release the electrode and start the electrode on its fall down the incline to effect the welding operation. Forming a part of the device is an electric switch having an arm adapted to be engaged by the manually operable means which raises the electrode to simultaneously close the contacts thereof and start the flow of electric current in the electrode. The manually operable means takes the form of a crank with a partial pinion thereon adapted to engage a rack on the slidable electrode holder. This pinion has a flat portion for releasing the rack and holder when the arc has been drawn. A lever device maintains the rack in tight engagement with the pinion.

For other objects and for a better understanding of the invention, reference may be had to the following detailed description taken in connection with the accompanying drawing, in which.

Figure 1:
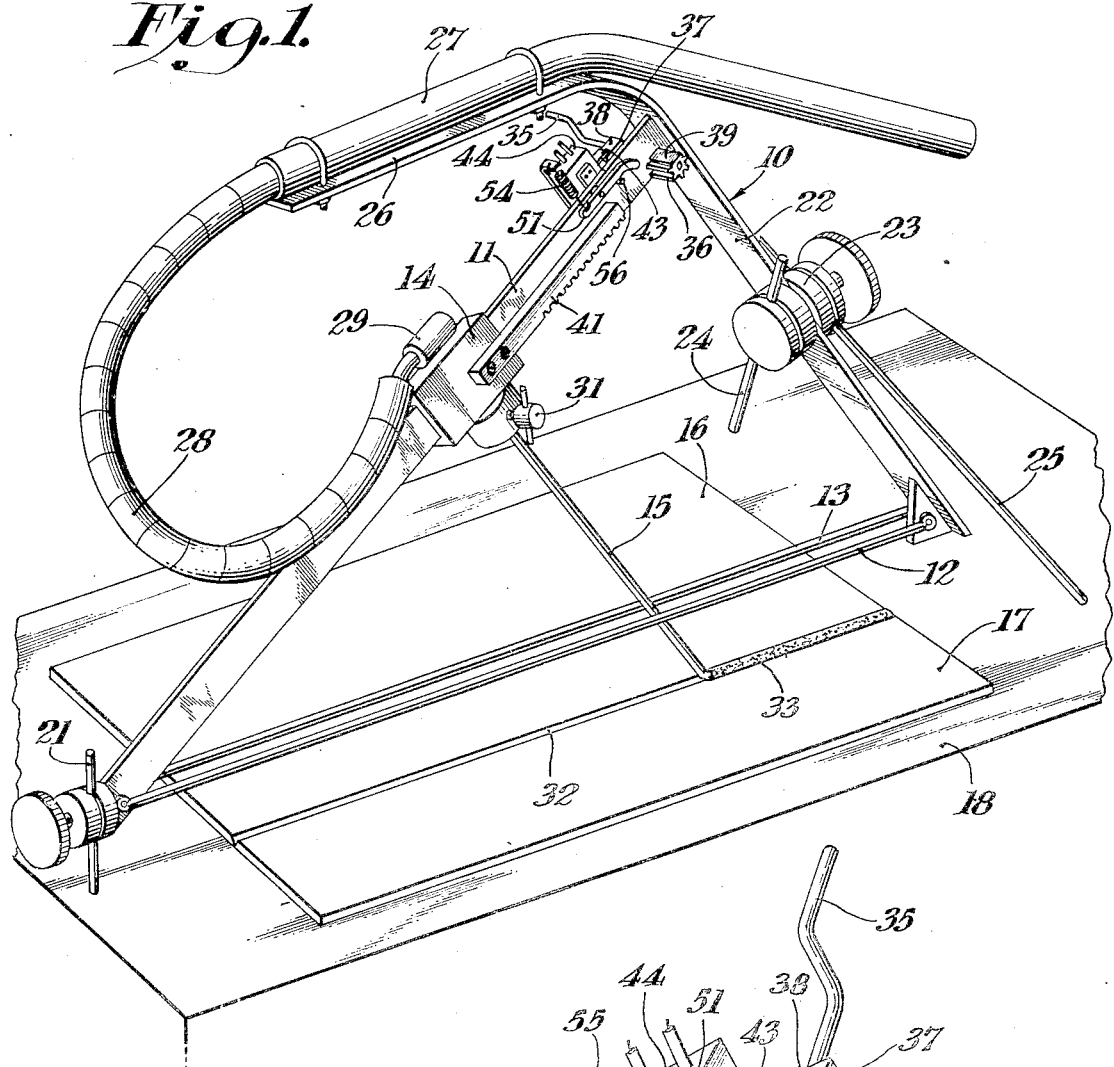
Fig. 1 is a perspective view of a gravity-feed arc-welding apparatus incorporating the starting device of the present invention.

Referring to Fig. 1, there is shown a triangular-shaped frame 10 including a slide or incline part 11 and electrode guide rods 12, 13. Slidable on the slide part 11 is an electrode holder 14 carrying an electrode 15 which extends downwardly between the guide rods for engagement with workpieces 16, 17 resting upon a table surface 18 and being welded together.

At the lower end of the slide part 11 is an adjustable supporting rod 21 and at the rearward end of the frame and connected to an upright part 22 is a double clamp 23 carrying support rods 24, 25. The frame is adjustable for different heights by effecting the adjustment of the supporting rods. By these rods the frame 10 is retained on edge with the guide rods 12, 13 extending parallel to the workpieces 16, 17.

Upright part 22 has an extension 26 at its upper end which supports a cable 27 having a flexible loop 28 connected with the electrode holder at 29. The loop 28 is of sufficient length as to permit free sliding movement of the holder 14 from one end of the slide part to the other end thereof.

Electrode 15 is fixed to the holder 14 by a clamping screw 31 and extends through the guide rods 12, 13 to the line of weld 32 between the workpieces 16, 17. Once the device has been started, the holder and the electrode fall, due to gravity, down the slide part and weld material 33 from the core of the electrode is deposited upon the workpieces 16, 17. The speed of movement of the electrode is determined by the speed at which the electrode 15 gives up the material 33.

Figure 2:
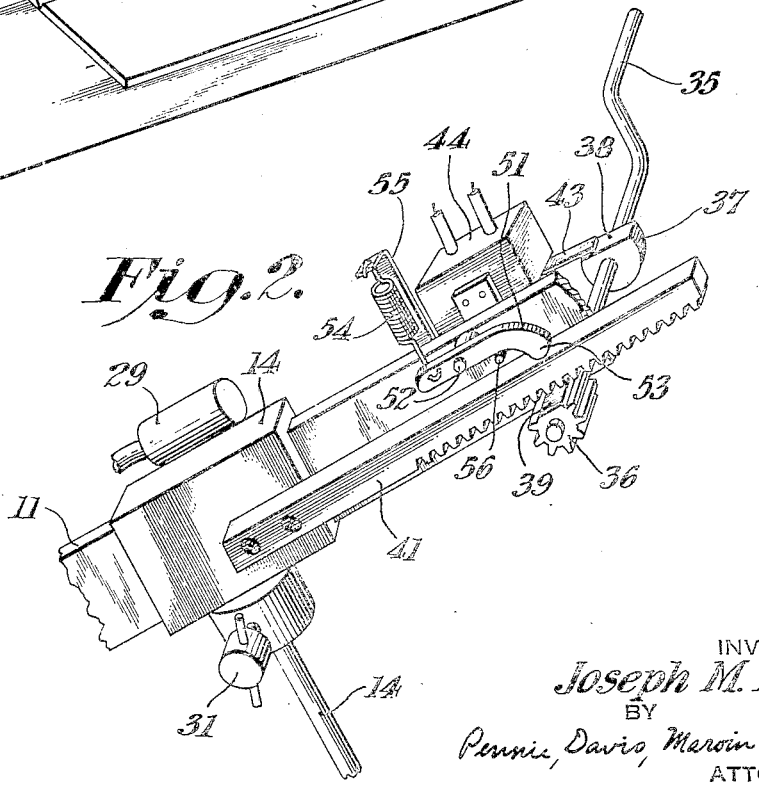
Fig. 2 is an enlarged fragmentary perspective view of the apparatus and of the starting device showing the rack on the pinion flat portion and released to permit the sliding movement of the electrode if the arc has been struck.

On the upper end of the frame slide part 11 is a manually-operated crank 35 having a partial pinion 36 on one end thereof and at one side of the slide part 11, and a cam 37 thereon at the opposite side of the slide part 11 which has a flat portion 38 thereon. This cam flat portion 38 is parallel to a flat portion 39 on the pinion 36. Secured to the electrode holder 14 is a rack 41 which extends rearwardly to lie over the pinion flat portion 39 when the holder 14 and electrode are supported by the lower end of the electrode upon the workpieces and with the holder at the upper end of the slide part 11. At this time the holder and the rack assume the position shown in Fig. 2.

To establish the arc, the electrode is raised slowly from the workpieces with the welding current on. This movement cannot be fast and must be steady.

As crank 35 is turned, the teeth on partial pinion 36 engage the rack teeth and the electrode holder and electrode are drawn slowly up the incline. Simultaneously, as this is done, a contact arm 43 of a switch 44 leaves the cam flat portion 38 and is pressed upwardly to close an electrical circuit which, through appropriate relays, starts the flow of welding current through cable 27 to the electrode and workpieces 16, 17.

Once the operator sees that the arc has been established, he reverses the turning movement of the crank so as to again bring the pinion flat portion 39 flush with the rack and thereby releases the rack from the pinion, whereupon the holder 14 and electrode 15 are released and the welding action follows. This welding action continues across the workpieces until the holder 14 has reached the lower end of the slide part 11. The arc gap is maintained between the lower end of the electrode and the workpieces 16, 17 by virtue of a crater which forms in the electrode tip and by the melted outer flux coating of the electrode which collects at the forward edge of the electrode so that the electrode rides thereover. The electrode 15 is retained in a straight line path by guide rods 12, 13.

Rack 41 is rigid with the holder 13 but, due to some looseness in the connection of the holder with the slide part, the rack may tend to leave the pinion. In order to keep the rack positively on the pinion during the starting operation, there is provided a lever 51 pivoted on the slide part 11 at 52, which has a head end 53 adapted to bear against the top of the rack 41. This lever is retained upon the rack 41 by a tension spring 54 connected between the lever and a vertically-extending bracket 55, also on slide part 11. The head end 53 is limited in its downward movement by a stop 56 extending laterally from the slide part 11. Head end 53 is rounded so as to permit the easy insertion of the rack between it and the pinion 36.

What is claimed is:

1. In a gravity-feed arc-welding apparatus, a frame including a slide part, means for supporting the frame on edge with the slide part inclined to the workpiece, an electrode holder slidable down the slide part, an electrode secured to the holder and extending into engagement with the workpiece to rest upon the same, and an arc starting device including manually operable means extending between the frame and the holder and adapted to lift the holder and electrode on the slide part whereby to draw an arc from the workpiece.

2. In a gravity-feed arc-welding apparatus, a frame including a slide part, means for supporting the frame on edge with the slide part inclined to the workpiece, an electrode holder slidable down the slide part, an electrode secured to the holder and extending into engagement with the workpiece to rest upon the same, and an arc starting device including a rack secured to the holder and extending parallel to the slide part, a crank pivotably connected to the frame and having a pinion adapted to cooperate with the rack on the holder to slowly move the holder and electrode upwardly upon the slide part whereby to draw the arc from the workpiece, said pinion having a flat portion for releasing the rack and holder from the pinion when the arc has been established.

3. In a gravity-feed arc-welding apparatus, a frame including a slide part, means for supporting the frame on edge with the slide part inclined to the workpiece, an electrode holder slidable down the slide part, an electrode secured to the holder and extending into engagement with the workpiece to rest upon the same, an arc starting device including a rack secured to the holder and extending parallel to the slide part, a crank pivotably connected to the frame and having a pinion adapted to cooperate with the rack on the holder to slowly move the holder and electrode upwardly upon the slide part whereby to draw the arc from the workpiece, said pinion having a flat portion for releasing the rack and holder from the pinion when the arc has been established and a lever pivoted on the slide part and engaging the rack and spring biasing means acting upon the lever, whereby to maintain the rack upon the pinion.

4. In a gravity-feed arc-welding apparatus, a frame including a slide part, means for supporting the frame on edge with the slide part inclined to the workpiece, an electrode holder slidable down the slide part, an electrode secured to the holder and extending into engagement with the workpiece to rest upon the same, an arc starting device including manually operable means extending between the frame and the holder and adapted to lift the holder and electrode on the slide part whereby to draw an arc from the workpiece and an electric switch adapted to control the welding current circuit associated with the manually operable means for turning on the welding current simultaneously with the operation of the manually operable means.

5. In a gravity-feed arc-welding apparatus, a frame including a slide part, means for supporting the frame on edge with the slide part inclined to the workpiece, an electrode holder slidable down the slide part, an electrode secured to the holder and extending into engagement with the workpiece to rest upon the same, and an arc starting device including a rack secured to the holder and extending parallel to the slide part, a manually operable crank pivoted on the upper end of the slide part, said crank having a partial pinion with a flat portion, an electric switch mounted on the slide part adjacent the crank and adapted to close the welding circuit, said switch having an operating arm, means on the crank for simultaneously operating the switch arm when the crank is turned whereby to close the welding circuit as the electrode is raised from the workpiece to establish the arc.

JOSEPH M. TYRNER.